United States Patent [19]
Offord et al.

[11] Patent Number: 5,550,528
[45] Date of Patent: Aug. 27, 1996

[54] MATCHING OF DIGITAL PATTERNS USING ANALOG LOGIC

[75] Inventors: Glen E. Offord, Macungie; Jeffrey L. Sonntag, Rockland Township, Berks County both of Pa.

[73] Assignee: Lucent Technologies Inc., Murray Hill, N.J.

[21] Appl. No.: 397,700

[22] Filed: Mar. 1, 1995

[51] Int. Cl.⁶ ................................................. G05B 1/00
[52] U.S. Cl. ............................................... 340/146.2
[58] Field of Search ........................................ 340/146.2

[56] References Cited

U.S. PATENT DOCUMENTS

| | | | |
|---|---|---|---|
| 4,450,432 | 5/1984 | Schmidtpott et al. | 340/146.2 |
| 4,560,974 | 12/1985 | Coleman et al. | 340/146.2 |
| 4,672,678 | 6/1987 | Koezuka et al. | 382/30 |
| 4,694,418 | 9/1987 | Ueno et al. | 364/807 |
| 4,716,540 | 12/1987 | Yamakawa | 364/807 |
| 4,736,437 | 4/1988 | Sacks et al. | 382/34 |
| 4,860,243 | 8/1989 | Ueno et al. | 364/807 |
| 4,933,662 | 6/1990 | Szczepanek | 340/146.2 |
| 5,046,019 | 9/1991 | Basehore | 364/513 |
| 5,140,538 | 8/1992 | Bass et al. | 364/602 |
| 5,220,306 | 6/1993 | Shimizu | 340/146.2 |

*Primary Examiner*—Margaret Rose Wambach
*Attorney, Agent, or Firm*—James H. Fox

[57] ABSTRACT

A fast, low power and small size approach to matching digital patterns provides for comparing of the input pattern bit-by-bit against the reference pattern to determine matches. In the illustrative embodiment, each mismatch turns on a current source. When the current from mismatches exceeds a maximum current sink value, the pattern mismatch output goes high. Both the reference pattern as well as the number of bits that must match may conveniently be made programmable. This approach is especially useful in "fuzzy" matching, where any N bits of an M bit pattern must match to consider the pattern matched.

10 Claims, 3 Drawing Sheets

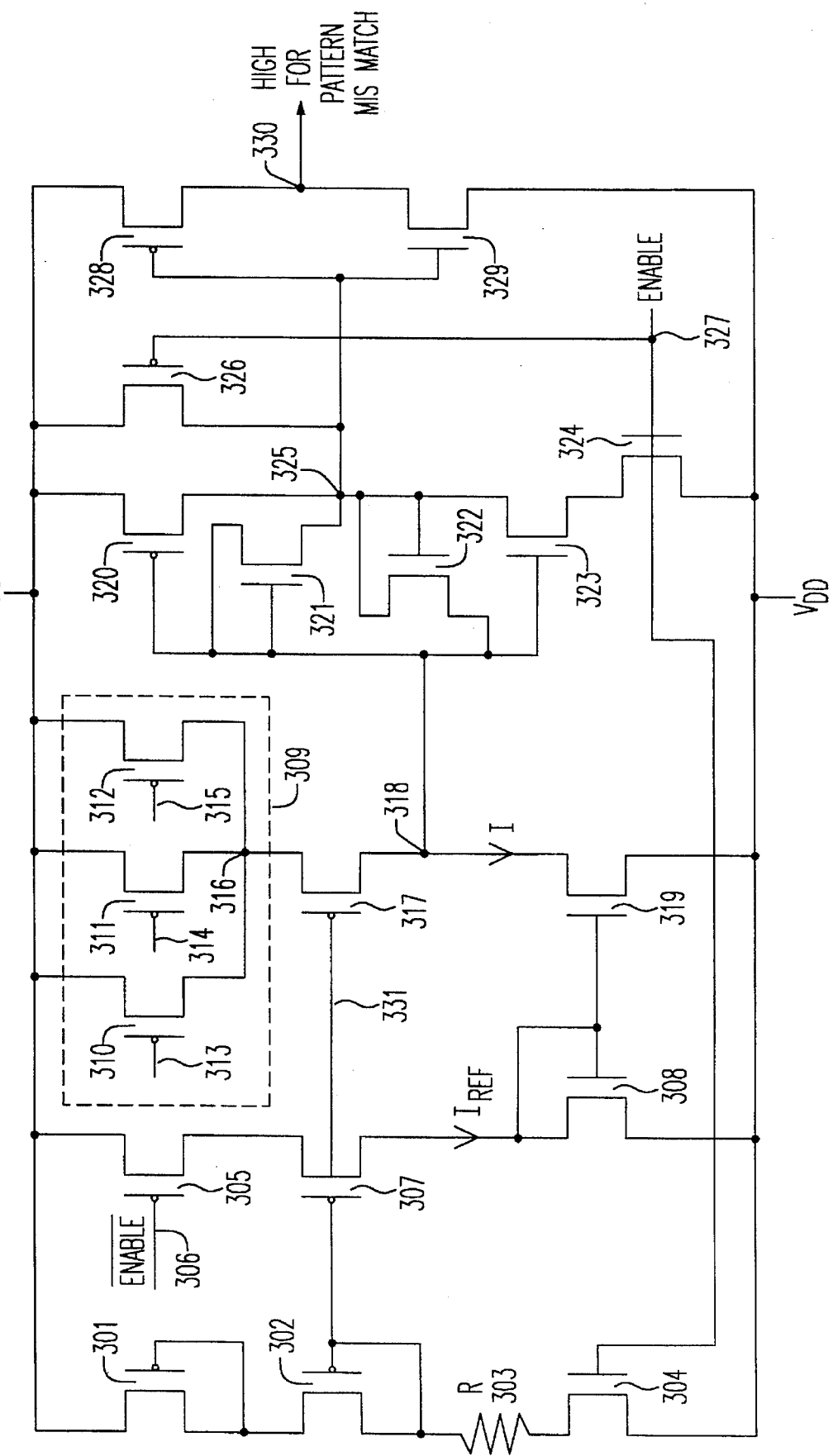

MATCHING OF DIGITAL PATTERNS USING ANALOG LOGIC

BACKGROUND OF THE INVENTION

1. Field of the Invention

The present invention relates to the matching of digital patterns using analog logic.

2. Description of the Prior Art

Matching of digital patterns is often accomplished using digital logic, wherein an input pattern is matched against a reference pattern. For example, referring to FIG. 1, a general overview of one method shows a series of XOR gates 101 . . . 104 that have a first set of inputs $A_1 \ldots A_4$ and a second set of inputs $B_1 \ldots B_4$, respectively. More generally, there may be n pairs of inputs to n XOR gates, where n is an integer. The binary digits of the input pattern are applied to the first set of inputs, and the binary digits of the reference pattern are applied to the second set of inputs, in order to perform "pair matches". When a pair match occurs, the $A_n$ input equals the $B_n$ input to a given XOR gate, and the given XOR gate output sets the associated control line (105, 106, 107 or 108) in a low state. However, when a pair mismatch occurs (i.e., when $A_n \neq B_n$), then the control line from the associated XOR gate output goes high. The number of pair mismatches may then be counted in a series of counters comprising first stages (109 and 110) and one or more subsequent stages (111), depending on the number of values to be matched. The output of the counter 118 represents the total number of pair mismatches, which is supplied via bus 112 to a comparator 113. A number of allowed pair mismatches, for example 2 mismatches, is supplied to the comparator via bus 114. If the number of pair mismatches on bus 112 is less than or equal to the allowed number on line 114, then the comparator provides a "pattern match" signal on comparator output line 115. Otherwise, a "pattern mismatch" signal is supplied on line 115.

As the number of values to be matched increases, the complexity of the counter 118 increases. This means that not only more first stage counters must be provided, but also more subsequent-stage counters. Hence, both the circuit complexity and size increases, and also the delay through the counter increases as the number of inputs (n) increases. Other pattern-matching techniques include the use of software programs, but they are typically not as fast as hardware-implemented techniques.

SUMMARY OF THE INVENTION

We have invented a digital pattern matching technique wherein a first set of values are compared to a second set of values by digital comparators. The outputs of the comparators are provided to controllable current sources, so that the output current from a given current source depends upon whether a match is indicated by the associated digital comparator. The outputs of the current sources are summed, and the total output current compared to a given value. A pattern match signal is provided depending on whether the total output current is greater or less than the given value, which may be a fixed value, or alternatively may be a programmable value. In this manner, a pattern match is indicated when the first and second sets of values at least partially match to within a desired degree.

BRIEF DESCRIPTION OF THE DRAWINGS

FIG. 3 shows schematically an array of current sources suitable for implementing the invention.

DETAILED DESCRIPTION

Figure 2:
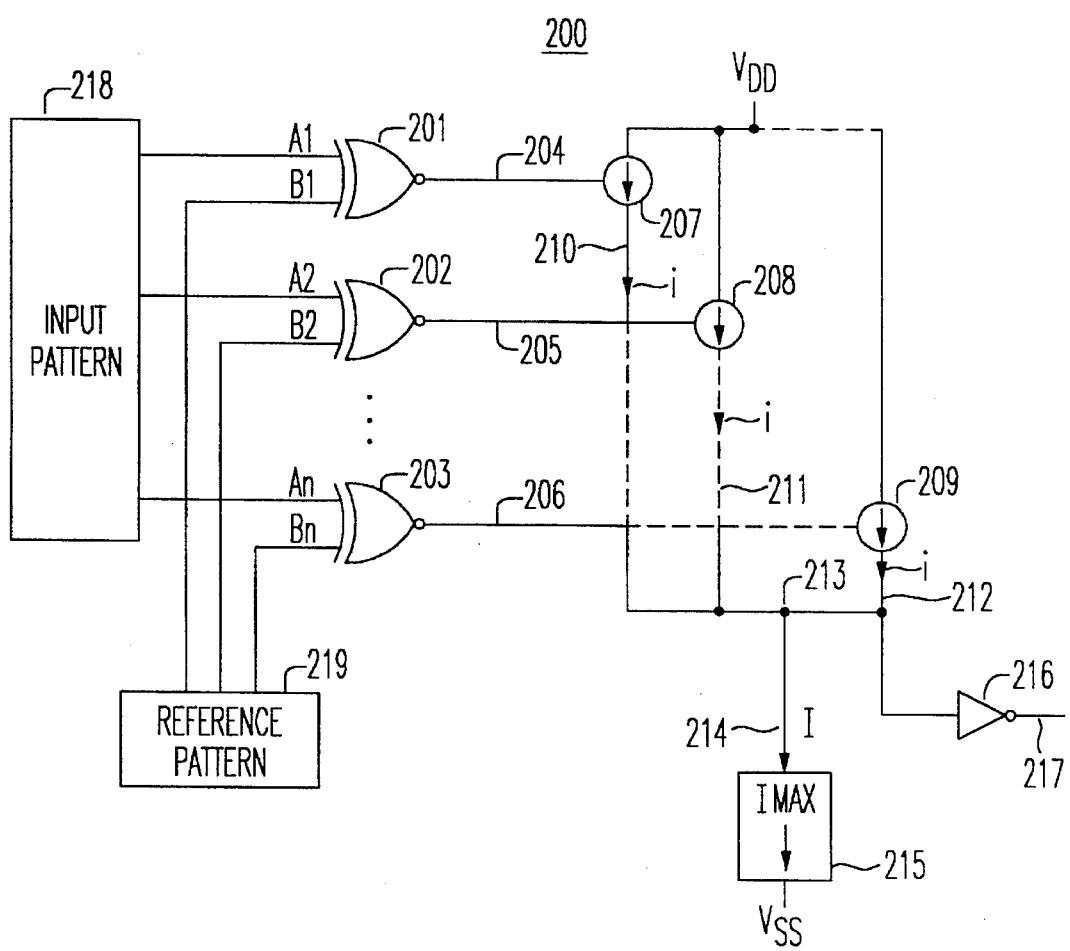
FIG. 2 shows an illustrative embodiment of the invention.

The following detailed description relates to a technique for matching digital patterns using analog logic. Referring to FIG. 2, an illustrative embodiment of the invention 200 includes a set of exclusive NOR (XNOR) gates 201, 202 and 203. These perform a digital comparison of the digits of the input pattern ($A_1$, $A_2$, $A_n$) with the digits of the reference pattern ($B_1$, $B_2$, $B_n$). The sources of the digital patterns (218, 219 respectively) may be any of a variety of devices, including for example optical and speech recognition devices. In one illustrative embodiment the source A is a magnetic disk drive that provides a data output, while the source B provides a reference pattern indicating that a desired location on a magnetic disk has been obtained. Note that the terms "input pattern" and "reference pattern" are used illustratively herein, but any two sets of digital values may be compared by the inventive technique. The outputs of the XNOR gates 201, 202 and 203 are connected via control lines 204, 205 and 206 to control inputs of current sources 207, 208 and 209, respectively. When a given pair of inputs mismatch (i.e., one input logic "0" and the other input logic "1"), then the output of the associated XNOR gate is low. This low output turns on the current source connected to the XNOR gate, providing a current "i" on the current line 210, 211 or 212 that is associated with that XNOR gate. However, when a given pair of inputs match, then the output of the associated XNOR gate is high. This high output turns off the current source connected to the XNOR gate.

The currents from the current sources that are turned on are summed at node 213, providing a total current "I" on line 214 to a current sink 215. The current sink 215 has a maximum value of current "$I_{max}$" that it can sink. When $I < I_{max}$, then the voltage on node 213 remains low, typically approximating $V_{SS}$ when the circuitry is implemented in CMOS technology. On the other hand, when $I > I_{max}$, then the voltage on node 213 goes high, typically approximating $V_{DD}$ in CMOS technology. Note that in practice, the total current flowing into node 213 from the turned-on current sources is always equal to the current I flowing into the current sink 215, assuming no other sources or sinks are present. Therefore, the currents "i" and "$I_{max}$" refer to nominal values when the voltage across the given source or sink is a given value. However, as the voltage at node 213 rises, the currents from the current sources decreases from the nominal value "i", and the value of current that can be sunk by the current sink increases from the nominal value "$I_{max}$". The summation of the currents "i" is the total current "I", which equals the current going into the current sink. When the total current "I" exceeds "$I_{max}$", then the voltage on node 213 rises. Note that the value of $I_{max}$ therefore determines how many of the input pairs ($A_1$–$B_1$ . . . $A_n$–$B_n$) must digitally match before a "pattern match" signal is provided at node 213, indicating that the patterns at least partially match to within a desired degree. In practice, the output node 213 is typically buffered, as by inverter 216, to provide an inverted output on line 217.

The current sources and current sink may be implemented by a variety of techniques known in the analog design art, with one presently preferred embodiment 300 shown in FIG. 3. An array of controllable current sources comprises the transistors shown in dotted block 309. Three p-channel transistors 310, 311 and 312 are illustrated, which comprise the control portions of current sources 207, 208 and 209 in FIG. 2. In general, any number (n) of transistors connected in a similar manner may be used in implementing a corresponding number of controllable current sources as shown in FIG. 2. The gate leads 313, 314 and 315, respectively, connect to the control lines 204, 205, and 206 (FIG. 2), respectively. The individual currents (i) flow through the turned-on control transistors and are summed at node 316 to form a total current (I) that flows through transistors 317 and 319. A bias network comprises transistors 301, 302 and 304, and resistor 303 having a value R. This network establishes a bias voltage on the gates of transistors 307 and 317, allowing for higher impedance current sources for both $I_{ref}$ and I.

The reference current $I_{ref}$ flowing through transistors 305, 307 and 308 represents the number of mismatches allowed. $I_{ref}$ is current mirrored and scaled via transistor 319 to establish the value of $I_{max}$. That is, as the number of turned-on control transistors increases (due to an increase in the number of pair mismatches at the inputs of XNOR gates 201 . . . 203), the value of I increases. Therefore, the voltage on node 318 rises. At some point, $I>I_{max}$, and the voltage on node 318 increases to beyond the switching threshold of the inverter formed by transistors 320, 321, 322 and 323, and the voltage on inverter output node 325 goes low. This causes the voltage on the gates of inverter transistors 328 and 329 to go low, causing the voltage on output node 330 to go high, indicating a pattern mismatch. Note that the entire array 300 is enabled when the voltage on $\overline{\text{ENABLE}}$ line 306 is low, and the voltage on ENABLE line 327 is high, allowing $I_{ref}$ to flow and enabling the output inverters.

Figure 1:
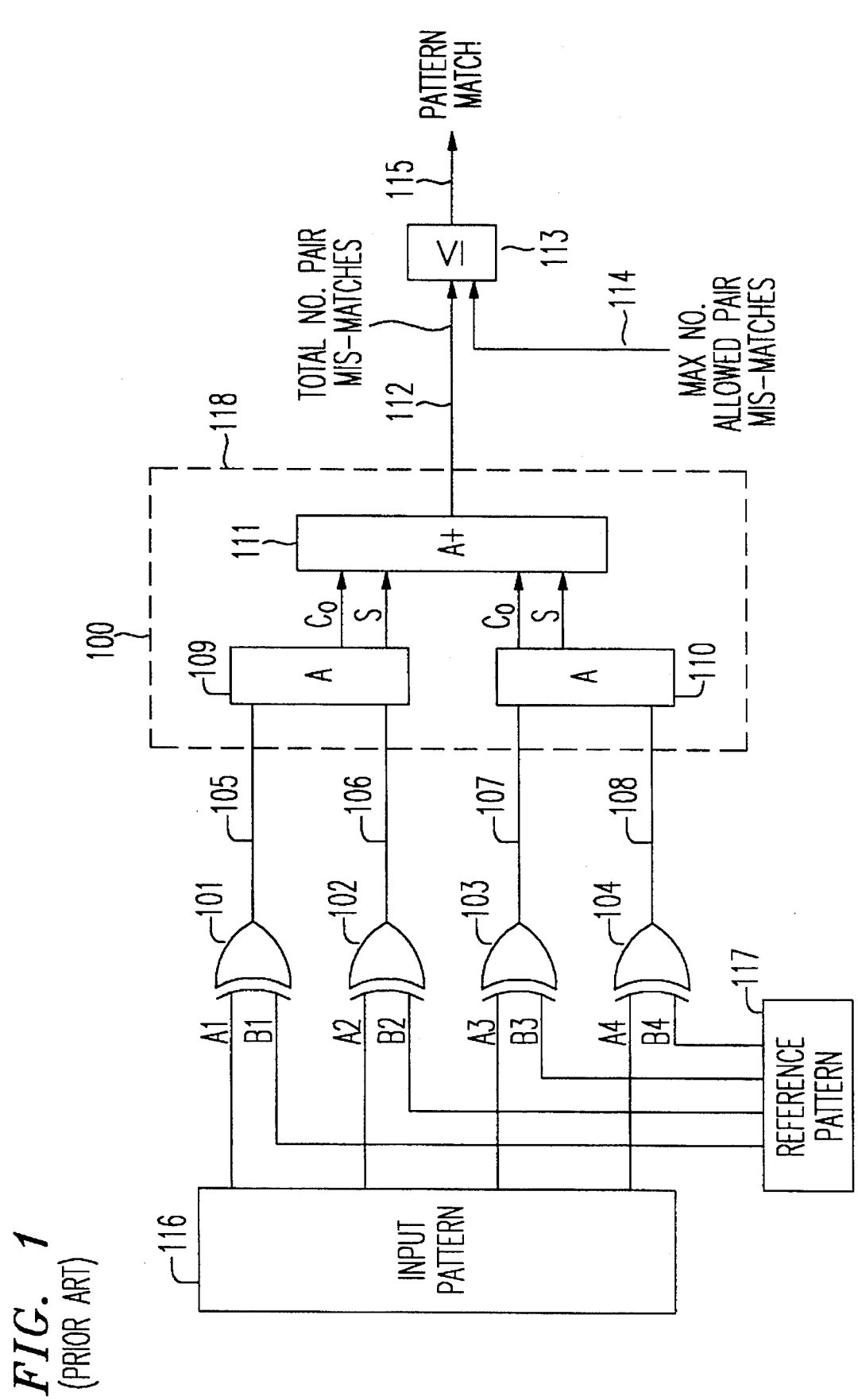
FIG. 1 shows a prior-art method of comparing digital values.

The digital comparators, controlled current sources, and current sink are typically formed on a single integrated circuit, with the source of the input pattern typically external thereto. The source of the reference pattern may hard wired logic, or alternatively a memory (e.g., static memory, read-only memory or programmable read-only memory) formed on the same integrated circuit as the pattern match logic. However, various other implementations are possible. The above embodiment shows a given current source being turned on when a given binary input pair mismatches. Therefore, the mismatch of a number of digital input pairs greater than a given value causes node 213 to go high, thereby indicating a pattern mismatch. However, in an alternative embodiment, a given current source is turned on when a given binary input pair matches. In that case, the voltage at node 213 goes high to indicate a pattern match. The digital binary comparators are implemented above using XOR gates (FIG. 1 ) and XNOR gates (FIG. 2), which may be generically referred to as performing the "exclusive OR" function. The exclusive OR function may be implemented with a variety of circuits known in the art. Furthermore, multi-level logic comparators may be used to compare more than two patterns at at time, and provide a multi-level output signal that indicates no mismatching inputs, a single pair of mismatching inputs, two pairs of mismatching inputs, etc.

The current sources may be controlled by an array of n-channel transistor in lieu of the array of p-channel transistors (309). Still other designs for the current sources and sinks are possible. Finally, while the current sink has been shown as having a fixed maximum current value ($I_{max}$), this value may be made programmable. This may be conveniently accomplished for example by providing transistors in parallel to 305, and turning them on or off as appropriate to increase/decrease the mismatch level. The reference pattern may also be made programmable if desired. This approach is especially useful in "fuzzy" matching, where any N bits of an M bit pattern must match to consider the pattern matched.

We claim:

1. An integrated circuit comprising circuitry for indicating whether a first set of digital values at least partially matches a second set of digital values to within a desired degree, said circuitry comprising:

set of digital comparators each having a first input for connection to a source of said first set of digital values and a second input for connection to a source of said second set of digital values, and an output;

and further comprising current sources each connected to an output of a digital comparator for providing a first value of current when a pair of digital values from said first and second sets are equal, and for providing a second value of current when the pair of digital values from said first and second sets are not equal, and a current summer for summing the currents from said current sources to produce a total current;

and still further comprises a current comparator that provides a first output signal when said total current exceeds a given value, and provides a second output signal when said total current is less than a given value, wherein said current comparator comprises a current sink that sinks a value of current up to a maximum value, beyond which the voltage across said current sink rises.

2. The invention of claim 1 wherein said digital comparators are exclusive OR gates, or alternatively exclusive NOR gates.

3. The invention of claim 1 wherein said current sources comprise a parallel array of field effect transistors having their gates coupled to the outputs of said digital comparators, and having their sources connected to a voltage source, and having their drains connected together at a common node.

4. The invention of claim 1 wherein said current sink comprises a proportional current mirror having a reference current flowing in a first branch and having said total current flowing in a second branch.

5. The invention of claim 1 wherein said second set of digital values is a reference pattern, and said integrated circuit further comprises said source of said second set of digital values.

6. An method for indicating whether a first set of digital values at least partially matches a second set of digital values to within a desired degree, said method comprising:

comparing a first set of digital values to a second set of digital values to produce comparison results;

controlling current sources by said comparison results to provide a first value of current when a pair of digital values from said first and second sets are equal, and to provide a second value of current when the pair of digital values from said first and second sets are not equal;

summing the currents from said current sources to produce a total current;

comparing said total current to a given value by means of a current sink that sinks a value of current up to a maximum value, beyond which the voltage across said current sink rises;

and providing a first signal when said total current is less than said given value, and providing a second signal when said total current is greater that said given value.

7. The invention of claim 6 wherein said comparing is accomplished by means of exclusive OR gates, or alternatively exclusive NOR gates.

8. The invention of claim 6 wherein said current sources comprise a parallel array of field effect transistors having their gates coupled to the outputs of said digital comparators, and having their sources connected to a voltage source, and having their drains connected together at a common node.

9. The invention of claim 6 wherein said current sink comprises a proportional current mirror having a reference current flowing in a first branch and having said total current flowing in a second branch.

10. The invention of claim 6 wherein said second set of digital values is a reference pattern, and said integrated circuit further comprises said source of said second set of digital values.

* * * * *